United States Patent [19]
Chung et al.

[11] Patent Number: 5,642,377
[45] Date of Patent: Jun. 24, 1997

[54] SERIAL SEARCH ACQUISITION SYSTEM WITH ADAPTIVE THRESHOLD AND OPTIMAL DECISION FOR SPREAD SPECTRUM SYSTEMS

[75] Inventors: Sanguoon Chung, San Diego; John W. Noneman, Valley Center, both of Calif.

[73] Assignee: Nokia Mobile Phones, Ltd., Salo, Finland

[21] Appl. No.: 506,336

[22] Filed: Jul. 25, 1995

[51] Int. Cl.⁶ ............................. H04B 15/00; H04K 1/00; H04L 27/30
[52] U.S. Cl. ........................ 375/200; 375/206; 375/367
[58] Field of Search ........................ 375/200, 205, 375/206, 367; 380/46; 370/18

[56] References Cited

U.S. PATENT DOCUMENTS

| | | | |
|---|---|---|---|
| 4,387,465 | 6/1983 | Becker | 375/1 |
| 4,550,414 | 10/1985 | Guinon et al. | 375/1 |
| 4,730,340 | 3/1988 | Frazier, Jr. | 375/1 |
| 5,109,390 | 4/1992 | Gilhousen et al. | 375/1 |
| 5,440,597 | 8/1995 | Chung et al. | 375/200 |

OTHER PUBLICATIONS

"Acquisition Time Performance of PN Spread Spectrum Systems", by J. Holmes and C. Chen, IEEE Trans. on Commun., pp. 778–783, Aug. 1977.

"Statistical Performance of Single Dwell Serial Synchronization Systems", by D. DiCarlo and C. Weber, IEEE Trans. on Commun. pp. 1382–1388, Aug. 1980.

"Double Dwell Maximum Likelihood Acquisition Systems With Continuous Decision Making For CDMA and Direct Spread".

"Multiple Dwell Serial Search: Performance And Application To Direct Sequence Code Acquisition", by D. DiCarlo and C. Weber, IEEE Trans. on Commun., pp. 650–659, May 1983.

"A Unified Approach To Serial Search Spread–Spectrum Code Acquisition. Part 1: General Theory," by A. Polydoros and C. Weber, IEEE Trans. on Commun., pp. 542–549, May 1984.

Primary Examiner—Stephen Chin
Assistant Examiner—Hai H. Phan
Attorney, Agent, or Firm—Perman & Green

[57] ABSTRACT

A PN code acquisition system for Code Division Multiple Access (CDMA) Direct Sequence Spread Spectrum (DSSS) systems, with automatic decision threshold, is based on the combination of the Maximum Likelihood (ML) and Serial Search (SS) acquisition approaches. In contrast to the conventional SS acquisition system, the disclosed system adaptively estimates optimal threshold by exploiting the statistics of the signal and noise, and makes an optimal decision based on the threshold. The system estimates the threshold by employing ML estimation and applies the threshold as in SS acquisition and makes a decision by comparing the updated threshold with the current signal strength. Together with post detection verification logic, this approach will increase detection probability and reduce false alarm probability significantly. An optimum system parameter design approach and the advantages of this approach as compared to conventional approaches (ML or SS acquisition) are demonstrated.

20 Claims, 9 Drawing Sheets

DS SIGNAL DWELL SERIAL SLIDING ACQUISITION SYSTEM

GENERAL FORM OF THE SIGNAL DETECTOR

FIG. 2A

CONTROL FLOW CHART

UPDATING OF NOISE ESTIMATE AND THRESHOLDS, DATA FLOW

HARDWARE/SOFTWARE PARTITIONING

BLOCK DIAGRAM OF OPERATING COMPONENTS

SERIAL SEARCH ACQUISITION SYSTEM WITH ADAPTIVE THRESHOLD AND OPTIMAL DECISION FOR SPREAD SPECTRUM SYSTEMS

BACKGROUND OF THE INVENTION

1. Field of the Invention

The present invention relates to mobile or cellular communication systems and more particularly to a system and method for pseudorandom noise (PN) code acquisition in Code Division Multiple Access (CDMA) Direct Sequence Spread Spectrum (DSSS) systems, with automatic decision threshold, based on a combination of the Maximum Likelihood (ML) and Serial Search (SS) acquisition approaches.

2. Prior Art

The primary function of psuedonoise (PN) code synchronization in spread spectrum communication systems, such as the Code Division Multiple Access Direct Sequence Spread Spectrum (CDMA-DSSS) system, is to despread the received PN code for demodulation of the received signal. The received signal in essence consists of two digital signals or bit streams that are combined to create a modulated third signal prior to transmission. The first digital signal is an information signal, such as the output of a digitized voice circuit, which may have a bit rate, for example, of 10 kb/s. The second signal is generated by a random-sequence or pseudonoise (PN) generator and constitutes a stream of essentially random bits having a bit rate that is several orders of magnitude greater than that of the digitized voice signal. The combination or modulated third signal that is actually transmitted has the same bit rate as the faster second signal while containing the slower voice signal.

At the receiver, after carrier frequency demodulation, despreading is accomplished by generating a local replica of the PN code with a random-sequence generator in the receiver and then synchronizing the local PN signal to the one that has been superimposed on the incoming received signal at the transmitter. By removing the random sequence from the received signal and integrating it over a symbol period, a despread signal is obtained which ideally exactly represents the original 10 kb/s voice signal.

The process of the signal synchronization is usually accomplished in two steps. The first step, called acquisition, consists of bringing the two codes or spreading signals into coarse time alignment within one code chip interval. The second step, called tracking, takes over and continuously maintains the best possible waveform alignment by means of a feedback loop. The focus of the present invention is on the acquisition aspect of the synchronization system.

Because of the importance of synchronization (or acquisition), many schemes have been proposed utilizing various types of detectors and decision strategies in different application areas. A common feature of all synchronization schemes is that the received signal and the locally generated signal are firstly correlated to produce a measure of similarity between the two. Secondly, this measure of similarity is compared to a threshold to decide if the two signals are in synchronism. If synchronization is detected, the tracking loop takes over. If there is no synchronization, the acquisition procedure provides a change in the phase of the locally generated PN code and another correlation is attempted as a part of a system search through the receiver's phase space.

There are two dwell time (or integration interval) schemes used for correlation, i.e., a fixed dwell time and a variable dwell time. The fixed dwell time approach is relatively simple to implement and analyze and, as a result, finds widespread use. The fixed dwell time technique can be implemented in one of two ways, i.e., as a single dwell time and as a multiple dwell time.

The speed and accuracy of acquisition are among, the major factors that limit the performance of CDMA receivers. Initial code acquisition is generally the most difficult operation to be performed in any spread spectrum system because of the system performance impairment factors such as a low signal to noise ratio (SNR), a doppler shift and a fading environment. Of primary interest here is a low SNR environment, so that consideration will be given to two known acquisition techniques, i.e., the maximum likelihood approach, such as described by M. K. SIMONS, J. K. OMURA, et al., in "Spread Spectrum Communications", Volume III, Rockville, Md., Computer Science Press, 1985, and the serial search approach, such as described by J. K. HOLMES and C. C. CHEN, in "Acquisition Time Performance of PN Spread-Spectrum Systems," IEEE Trans. on Commun., pp 778–783, August 1977, and by D. M. DiCARLO and C. L. WEBER, in "Statistical Performance of Single Dwell Serial Synchronization Systems," IEEE Trans. on Commun., pp 1382–1388, Aug. 1980.

The maximum likelihood approach is the most robust acquisition approach to dealing with noise. This technique with a single dwell time requires that the received PN code signal be correlated with all possible code positions of the local PN code replica. The correlations can be performed in parallel and the corresponding detector outputs all pertain to the identical observation of the received signal (plus noise). The correlations can also be done serially, which is preferred because of the reduced hardware complexity. The correct PN alignment is chosen by a comparator for a local PN code phase position which produces the maximum integrated signal energy output from the detector. The acquisition can be accomplished rapidly because all possible code offsets are examined simultaneously. However, for long PN codes with large processing gain, such as those required in a CDMA spread spectrum system, the complexity of the parallel implementation involved or the time to search the entire code space in a serial implementation before reaching a decision often render this approach unacceptable.

The serial search approach involves a search which is performed by linearly varying the time difference between PN modulation on the received incoming PN code and the locally generated PN code with a continuous decision process determining when synchronization is achieved. This approach is also referred to in the literature as a single dwell serial sliding acquisition system and is illustrated in FIG. 1. As seen in the Figure, the Received PN code signal is combined, by multiplying, with the locally generated PN code signal from a Local PN Generator and the resultant signal is integrated in an Integrator and input for threshold comparison to a Compare Threshhold unit. If the comparison is positive (YES), a Correct code phase decision signal is output. If the comparison is negative (NO), a feedback signal is generated and sent to the Local PN Generator to update the phase of the local PN code phase. Updating is carried on in this manner until a positive output results at the Compare Threshold unit.

Since this test for synchronization is based on the crossing of a threshold, when compared with the serial maximum likelihood acquisition system mentioned above, this scheme trades off shorter acquisition time against reduced accuracy in detection of synchronization. This is due to the fact that the conventional serial search algorithm uses a fixed threshold, which is set a priori, so that the detection of synchronization is an approximation and thus inexact. Clearly, the best acquisition performance of the serial search approach or system would be obtained by using the optimal threshold for that system at the actual time of operation. However, in a practical communication environment, the optimal threshold is a function of signal to noise ratio (SNR) which, in a mobile system, may be quite different from one time and place to another.

In such a practical communication environment, to achieve efficient operation of a direct sequence spread spectrum (DSSS) receiver an automatic level control for the decision threshold must be used. There are several articles published on algorithms for automatic control of the decision threshold, such, for example, as two by S. G. GLISIC, i.e., "Automatic Decision Threshold Level Control (ADTLC) in Direct Sequence Spectrum Systems Based on Matched Filtering", IEEE Trans. on Commun., Vol.-36, pp 519–528, Apr. 1988, and "Automatic Decision Threshold Level Control in Direct-Sequence Spread Spectrum Systems", IEEE Trans. on Commun., Vol.-39, No. 2, pp 187–192, Feb. 1991.

These and most of the disclosed automatic threshold control algorithms exploit the statistics of noise characteristics by employing two parallel signal energy detectors. The statistics of noise characteristics are obtained by despreading a received signal through applying two time displaced versions of the local PN code to the two parallel signal detectors, and choosing the smaller signal energy from the two outputs of the detectors. These automatic threshold control algorithms use the instantaneous noise characteristics or a filtered version of noise statistics to control their decision threshold, such as described by S. G. GLISIC in the above-noted IEEE February 1991 article, and by co-inventor. S. CHUNG and S. CZAJA, in the commonly-assigned, U.S. Pat. No. 5,440,597 entitled "Double Dwell Maximum Likelihood Acquisition Systems with Continuous Decision Making for CDMA and Direct Spread Spectrum Systems".

Problem to be Solved

Most of these latter algorithms require the optimization of design parameters based on the expected SNR or communication environment, which is still not fully signal adaptive. Consequently, the prior art lacks a system and method for optimizing the detection of synchronization between received and local PN codes and in making the threshold decision in detecting synchronization.

Objects

It is therefore an object of the present invention to provide an improved acquisition system in a DSSS receiver wherein the detection of synchronization of PN codes is optimized.

It is another object of the invention to provide an acquisition system for DSSS receivers utilizing improved automatic level control for the threshold decision in promptly detecting synchronization.

It is a further object of the invention to provide an acquisition system for DSSS receivers utilizing a noise energy estimator for estimating the actual signal SNR and a post detection verification period for improving decision accuracy.

SUMMARY OF THE INVENTION

The present invention is a modified and improved version of the acquisition system described in the above-noted co-pending patent application, Ser. No. 08/157,376, which is incorporated herein by reference. The two systems have such common features as, for example, signal detection and estimation, but differ with regard to the fact that the present invention, first, has a noise energy estimator providing a noise estimate that is used in the estimation of the signal to noise ratio (SNR), and second, the SNR is used to calculate the optimal threshold and the corresponding false alarm rate. Also, the false alarm rate, which is a function of signal energy and the noise estimate, is used to determine the number of noise bins to be tested after the detection of the synchronization candidate and before stopping the search. This search interval constitutes a post detection verification period.

The acquisition system of the invention retains all of the advantages of the maximum likelihood acquisition system as well as those of the serial acquisition system, but, unlike the maximum likelihood system, the present system makes a decision whenever a reliable synchronization is detected without having to search the entire PN space. Further, unlike the conventional serial search system, the present acquisition system uses a signal dependent adaptive optimal threshold and stops the acquisition process after it confirms the reliability of its decision (i.e., after the post detection verification period), rather than immediately after synchronization detection. By combining features of the conventional maximum likelihood approach and serial search approach, and of the system disclosed in the foregoing co-pending application, in an appropriate way, the new approach achieves faster acquisition as compared to both of the conventional maximum likelihood and serial search approaches, has more accuracy in detection of synchronization as compared to the conventional serial search approach, and more reliability and controllability as compared to the system of the co-pending application.

DETAILED DESCRIPTION OF THE PREFERRED EMBODIMENT

Figure 1:
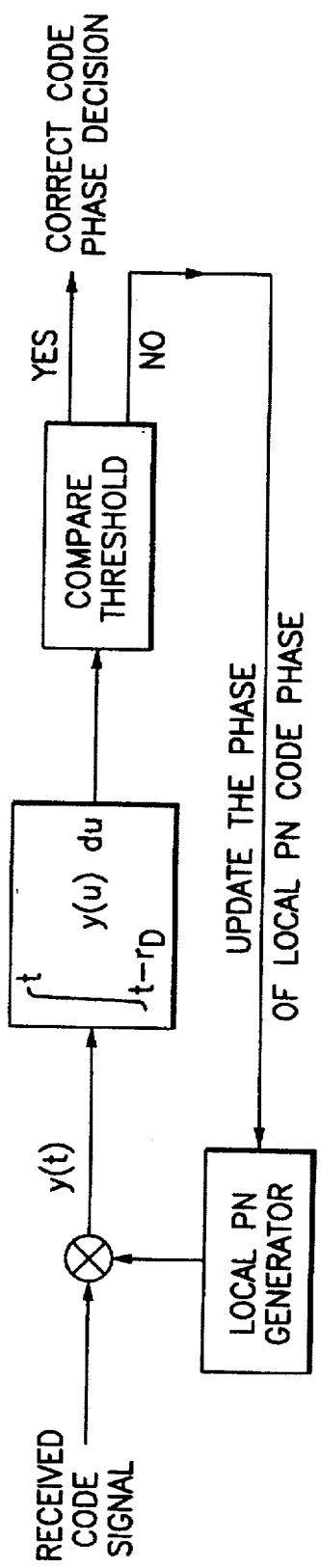
FIG. 1 illustrates a prior art DS single dwell serial sliding acquisition system.

As indicated above, because of the importance of synchronization (or acquisition) in wireless or mobile communication receivers, such as DSSS receivers, many schemes have been proposed utilizing various types of detectors and decision strategies in different application areas. A common feature of these synchronization schemes is that the received signal and a locally generated PN code signal are, firstly, correlated to produce a measure of similarity between the two PN codes, and secondly, this measure is compared to a threshold to decide if the signals are in synchronization. If synchronization is detected, a tracking loop takes over. If there is no synchronization, the acquisition procedure produces a change in the phase of the locally generated PN code and another correlation is attempted as part of a system search through the receiver's phase space. A system implementing this scheme is shown generally in FIG. 1 as prior art.

The present invention involves applying a dual principle to the conventional serial search acquisition system. The conventional serial search algorithm detects a signal having a level that exceeds a threshold which is determined by employing an expected SNR of the communication environment and is used to classify a signal versus noise. In this sense, as will be better understood upon consideration of the description below, the threshold of the serial search system is equivalent to the "signal classification threshold", $T_{SC}$, in the system of the invention. For the purposes of the invention, a simple assumption is used, that is, that the noise level does not exceed the threshold but the signal level does. As a result, the search process may be stopped as soon as a signal is detected with an energy level that exceeds the threshold.

More particularly, the system of the invention uses a signal detection threshold, $T_{SD}$, for signal level detection and the signal classification threshold, $T_{SC}$, for identifying noise. The identified noise statistics are used to estimate the SNR and the SNR is used to update the signal classification threshold $T_{SC}$ whenever a new signal candidate is detected by the signal detection threshold $T_{SD}$. In this sense, the signal classification threshold $T_{SC}$ is equivalent to the threshold used in the conventional serial search acquisition system. The $T_{SC}$ is used to make a decision to stop or to continue in a post detection verification process. The implication of the post detection verification process is as follows. If the detected signal candidate is actually noise, its corresponding SNR and corresponding signal classification threshold are low, their corresponding false alarm probability is high, and their false alarm rate is high. On the other hand, if the detected signal candidate is actually signal, its corresponding SNR and corresponding signal classification threshold are high, their corresponding false alarm probability is low, and their false alarm rate is low. Further, it is expected to have another signal candidate in the order of chip periods of the inverse of the false alarm probability. Based on this observation, the number (i.e., threshold $C_N$) of the noisy bins to be tested is determined and used to make a decision to stop or to continue the search process. The number of noisy bins tested during this post detection verification process is a function of the false alarm rate.

As the system of the invention is a modified version of conventional serial search systems it has several common features, for instance, the threshold and stop process. However, the present system is significantly different from conventional serial search systems from the following two points of view. First, the estimation and usage of the decision threshold is different. Unlike conventional serial search systems which use a fixed predetermined threshold, the system of the invention uses a signal dependent adaptive optimal threshold by exploiting the SNR of the communication environment in real time. Second, the operation of the threshold and acquisition termination process is different from conventional serial search systems. Conventional serial search systems produce a cross correlation between the incoming received signal and the locally generated PN code and then compare the result with a predetermined and fixed threshold. Conventional serial search systems stop the acquisition process, if the correlation value exceeds the threshold, or continue the acquisition process, if the correlation value does not exceed the threshold. Unlike conventional serial search systems, the system of the invention uses two kinds of threshold in each dwell stage of the system. One is a signal detection threshold and the other is a signal classification threshold. The present system produces the cross correlation between the incoming received signal and the locally generated PN code in the manner of the prior art and then compares the result with a signal detection threshold which is a maximum likelihood threshold (or estimate of the signal so far). If the correlation value or result exceeds the signal detection threshold, the present system updates its signal detection threshold with the correlation value, updates its signal classification threshold by exploiting SNR, changes the phase of the locally generated PN code, and continues the acquisition processing. The new acquisition system continuously monitors the reliability of the detected signal (or PN phase) and makes a decision to stop the search process whenever the detected signal (or PN phase) is determined to be reliable, by using a post detection verification process.

The two kinds of thresholds are signal dependent and are always obtained from the correlation value of the received signal and locally generated PN sequence as part of the acquisition process itself. The acquisition algorithm of the invention obtains the signal detection threshold from the maximum correlation value obtained in the acquisition process, and obtains the signal classification threshold from the average value of the signal detection threshold and noise level. Since the difference between the conventional serial search and the present acquisition algorithm is the estimation and usage of the threshold along with the termination process, the present acquisition algorithm can be applied to any dwell acquisition system, i.e., a single or a multiple dwell acquisition system.

As it is well known that a double dwell acquisition system is the most effective trade off between complexity and performance (see, for example, the above-cited M. K. SIMONS, et al., reference), a double dwell acquisition system is preferred for application with the acquisition algorithm of the invention.

SYSTEM DESCRIPTION AND OPERATION

Accordingly, a double dwell acquisition system will be used in illustrating the algorithm details and design methodology of the invention. It will be assumed that the PN signal to be acquired is a binary baseband waveform so that the determination of successful synchronization can be accomplished by correlating the received signal with a locally generated PN code in the receiver and examining the correlator output. It is also assumed that there is an m total uncertainty of PN chips (or space) to be resolved. If the time delay (or phase) of the local PN signal (or code) is retarded (or advanced) in discrete steps of a fraction p of the chip time, there will be $q=m/p$ possible code alignments or cells to be searched. The serial acquisition technique is begun by successively examining each of the possible alignment positions and continues until the proper cell is discovered. The general approach of the invention in determining the system and algorithm design parameters will be described below, but first the details of a specific working embodiment will be described.

Figure 2A:
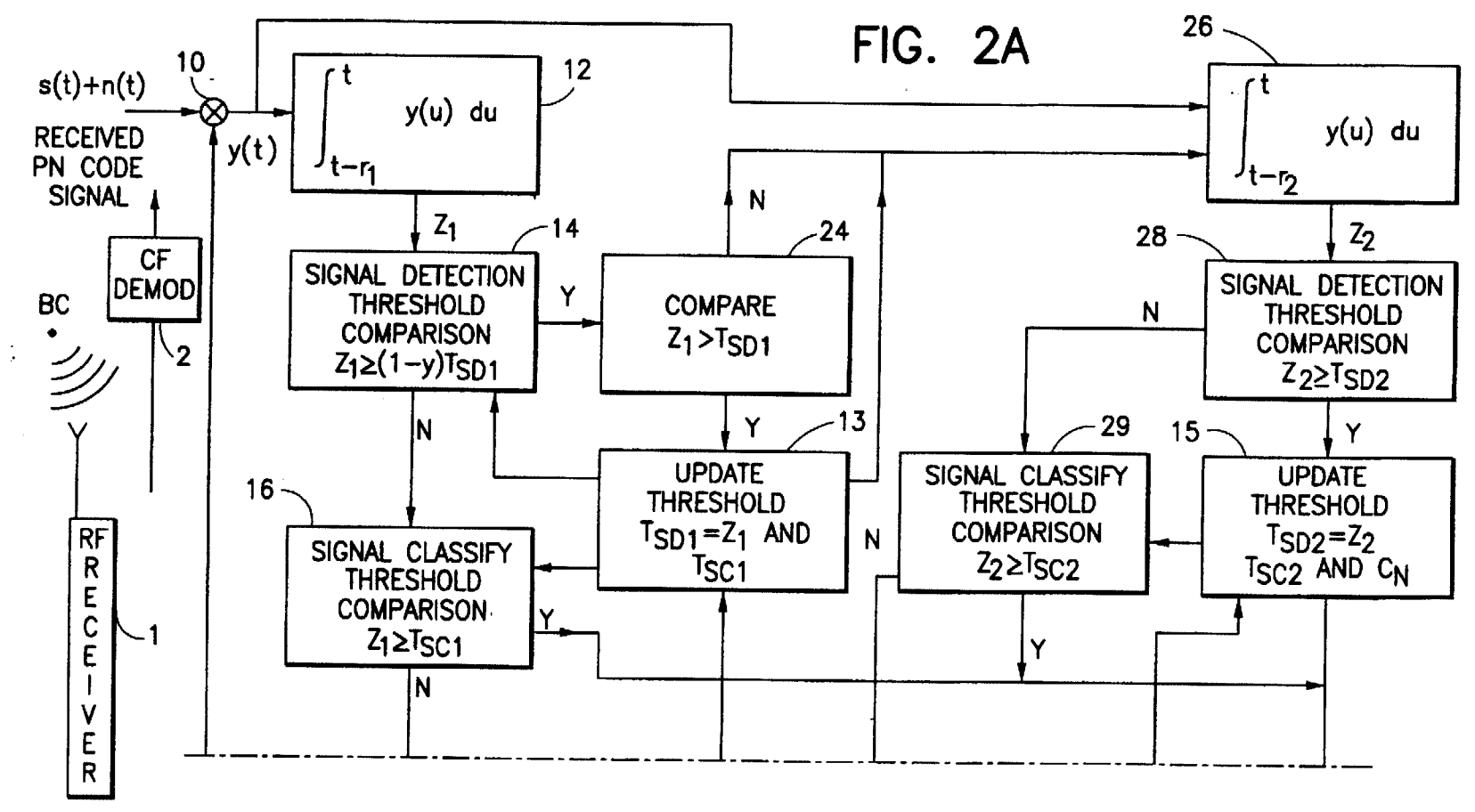
Figure 2B:
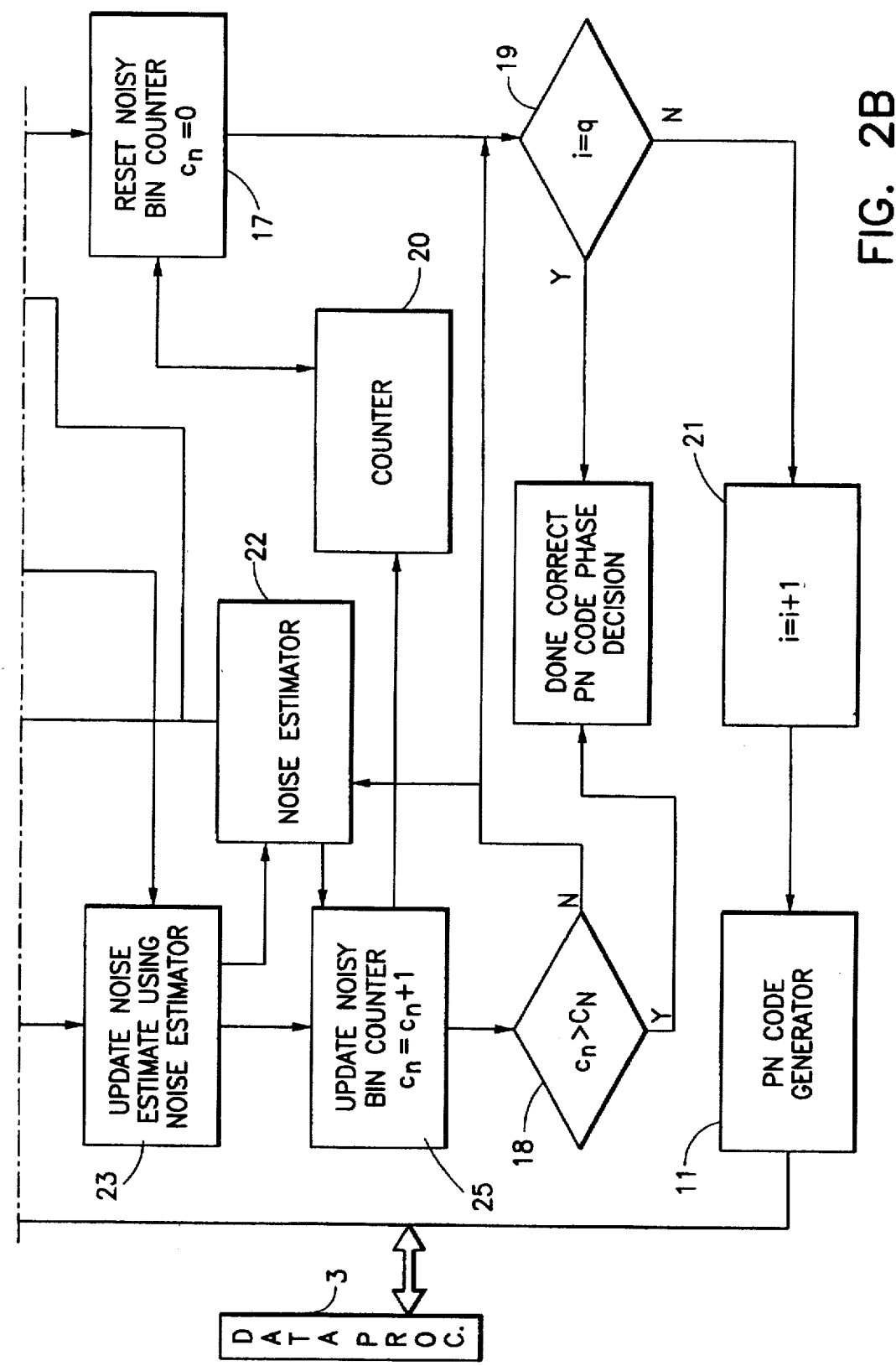
FIG. 2 is a block diagram of the operating components of a preferred embodiment of an acquisition system in accordance with the present invention.

FIG. 2 illustrates an acquisition system in accordance with the present invention. This system may be part of a receiver of a telecommunications device, such as a CDMA radiotelephone that operates in accordance with the TIA/EIA Interim Standard, Mobile Station-Base Station Compatability Standard for Dual-Mode Wideband Spread Spectrum Cellular Systems, TIA/EIA/IS-95 (July 1993). When the radiotelephone is energized, one or more pilot channels are received from a neighboring Base Station or Stations. Each pilot channel conveys a PN code sequence that differs in phase (e.g., that is offset in GPS time) from the PN code sequences of the pilot channels of other Base Stations within the system. A function of the receiver's acquisition system is to synchronize the local PN generator to the PN sequence of a pilot channel that has a signal strength that exceeds the noise level by an acceptable increment after despreading. The acquisition system operates in conjunction with an RF receiver 1 and carrier frequency demodulator 2 to receive a PN code signal from the pilot channels of one or more transmitting Base Stations and is also connected during use to a controller 3, such as a data processor, from which integration times and certain thresholds may be loaded. The data processor may also be capable of reading out values from the acquisition system, such as the phase of the PN code that results in an optimum correlation with the received PN code signal, and the adaptively obtained thresholds.

Figure 5:
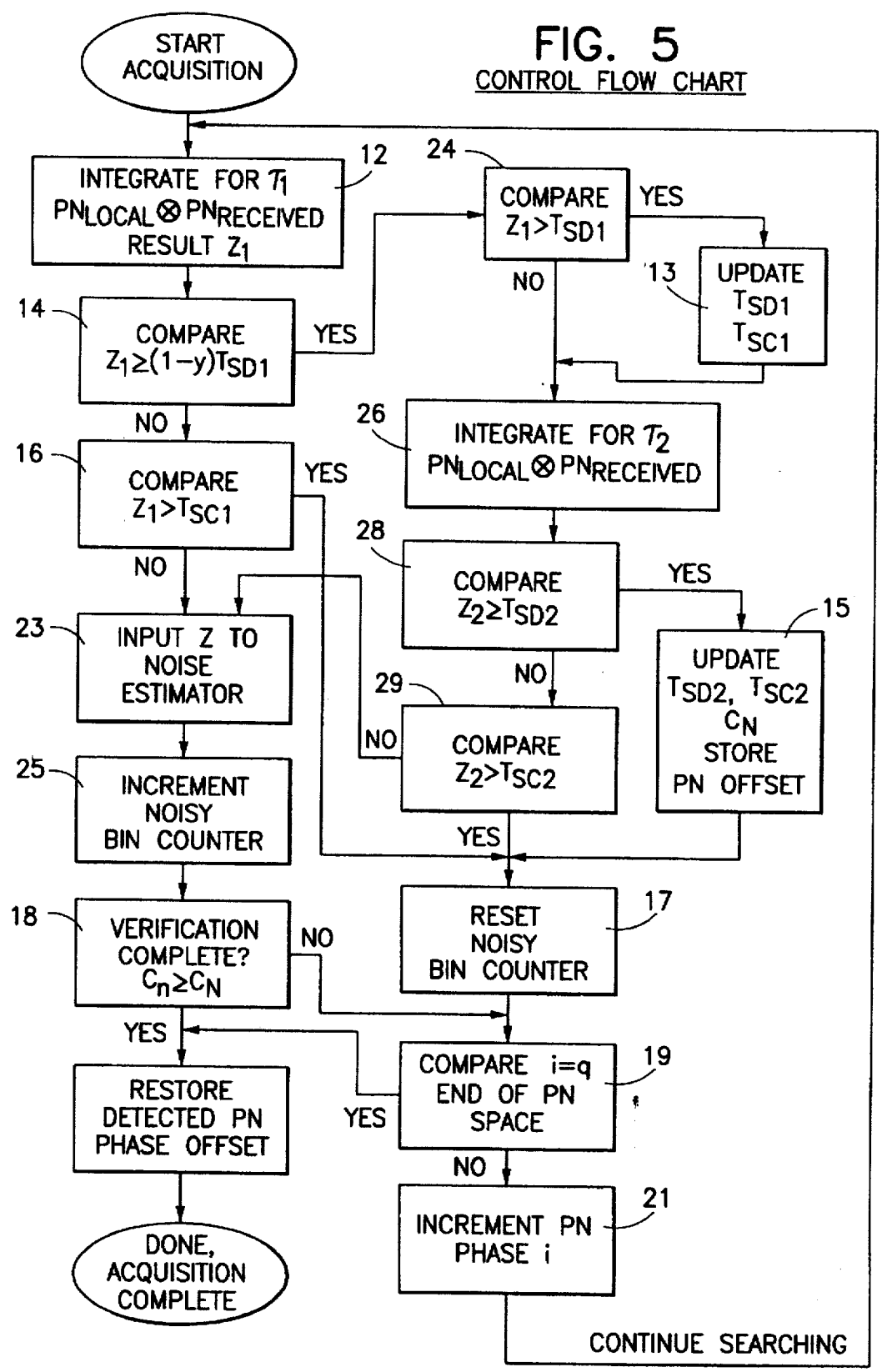
FIG. 5 is a control flow chart illustrating the operation of the preferred embodiment.

As seen in FIG. 2, the received PN code signal plus noise, s(t)+n(t), is multiplied in a multiplier 10 by the locally generated PN code from PN code generator 11 in the receiver, and the output, y(t), is applied to a first integrator 12 and a second integrator 26. This is the START of the acquisition process, which is also diagrammed in flow chart form in FIG. 5. The first integrator 12 is a trial (or short) integrator having an integration period of $\tau_I$ seconds during which the signal energy level is determined. The first integrator output $Z_1$ at time t is compared in comparator 14 to determine if it is equal to or greater than a signal detection threshold $T_{SD1}$ times (1−y). The signal detection threshold $T_{SD1}$ is the maximum integrator output, i.e., the maximum integrated signal energy output, obtained from past history till i−1, where i is the PN phase at time t, and y is between 1/16 and 1/8.

If the first integrator output $Z_1$ at time t is not equal to or does not exceed the value of (1−y)$T_{SD1}$, then $Z_1$ is compared in comparator 16 with the signal classification threshold $T_{SC1}$, which is the optimal threshold between a noise estimate $E_N$ from noise estimator 22 and the signal detection threshold $T_{SD1}$. If the first integrator output $Z_1$ is equal to or exceeds the signal classification threshold $T_{SC1}$, the following operations occur. First, the system's noisy bin (or incorrect cell) counter 20 has its count $c_n$ reset to zero by a YES signal to reset block 17. Next, in response to a signal from block 17, the phase i of the locally generated PN code signal is compared with q in comparator 19 to determine if the end of the PN code space has been reached. If not, then a NO signal causes the phase i to be changed by a fraction of a chip in block 21, the phase of the PN code generator 11 is updated and the correlation is reexamined. If the phase i=q, the search process is terminated, by a YES signal from comparator 19, indicating that an exhaustive search has been made of the PN code space and a correct PN code phase decision has been made. It is noted that q is the size of the cells (or PN phases) to be searched in the PN space, and can be selected as either the total number of PN chips in the code space or a multiple number of PN chips, less than all, in the code space, depending upon the chip resolution required. As an example, in a specific embodiment q may be the total number of PN chips in the code space and have a value of $2^{15}$ (32,768).

Returning to comparator 16, if the first integrator output $Z_1$ is not equal to or does not exceed the signal classification threshold $T_{SC1}$, a NO signal to update block 23 causes the noise statistic to be updated by a noise estimator 22 (e.g., a one-pole IIR or averaging operator) and a signal from block 23 to block 25 causes the noisy bin counter's count $c_n$ to be increased by 1. The count $c_n$ is then compared, in comparator 18, with a threshold $C_N$. The threshold $C_N$ is the number of noisy bins (or incorrect cells) to be counted before stop search, after the detection of the synchronization candidate, and is obtained by exploiting the false alarm probability as will be more fully explained below in connection with FIG. 4. If the count $c_n$ of the noisy bin (or incorrect cell) counter 20 is equal to or exceeds the threshold $C_N$, a YES signal causes the acquisition system to stop or terminate the search process. This ends the post detection verification process wherein the acquisition system evaluates a reasonable number of noisy bins (or incorrect cells) after obtaining a reliable PN code signal (or cell). As an example, a suitable value for $C_N$ would be in the range of approximately 70 to 150, and selected to provide a detection probability that exceeds, e.g., 95%, depending upon the SNR.

It should be noted that noise estimator 22 is preferably a one-pole Infinite Impulse Response (IIR) filter which averages noise energy measurements from the integrator output. The signal classification and signal detection comparison operations act as a gate to present to the IIR filter input only energy measurements which are below both $T_{SD}$ and $T_{SC}$ and thus such measurements are noise. The transfer function of the noise estimator 22 (IIR low pass filter) is:

$$y_n = A y_{n-1} + B x_n$$

where $y_n$ is the IIR filter output;
$x_n$ is an input sample;
A is approximately 0.95; and
B is 1−A, or approximately 0.05.

Hence, this IIR filter has a time constant of approximately 20 samples using the A and B values indicated.

If the noisy bin counter count $c_n$ does not exceed the threshold $C_N$, a NO signal causes testing for the detection of the end of searching the PN space at comparator 19. If i=q, then searching is terminated. If i≠q, then the phase i of the locally generated PN code signal is incremented by a fraction of a chip and the correlation is reexamined. The process continues in this manner until the value of the first signal detection threshold $T_{SD1}$ times (1−y)) is equaled or exceeded by $Z_1$ in comparator 14 for the short correlation integration interval $\tau_1$, or an end of searching or termination signal is produced.

Figure 6:
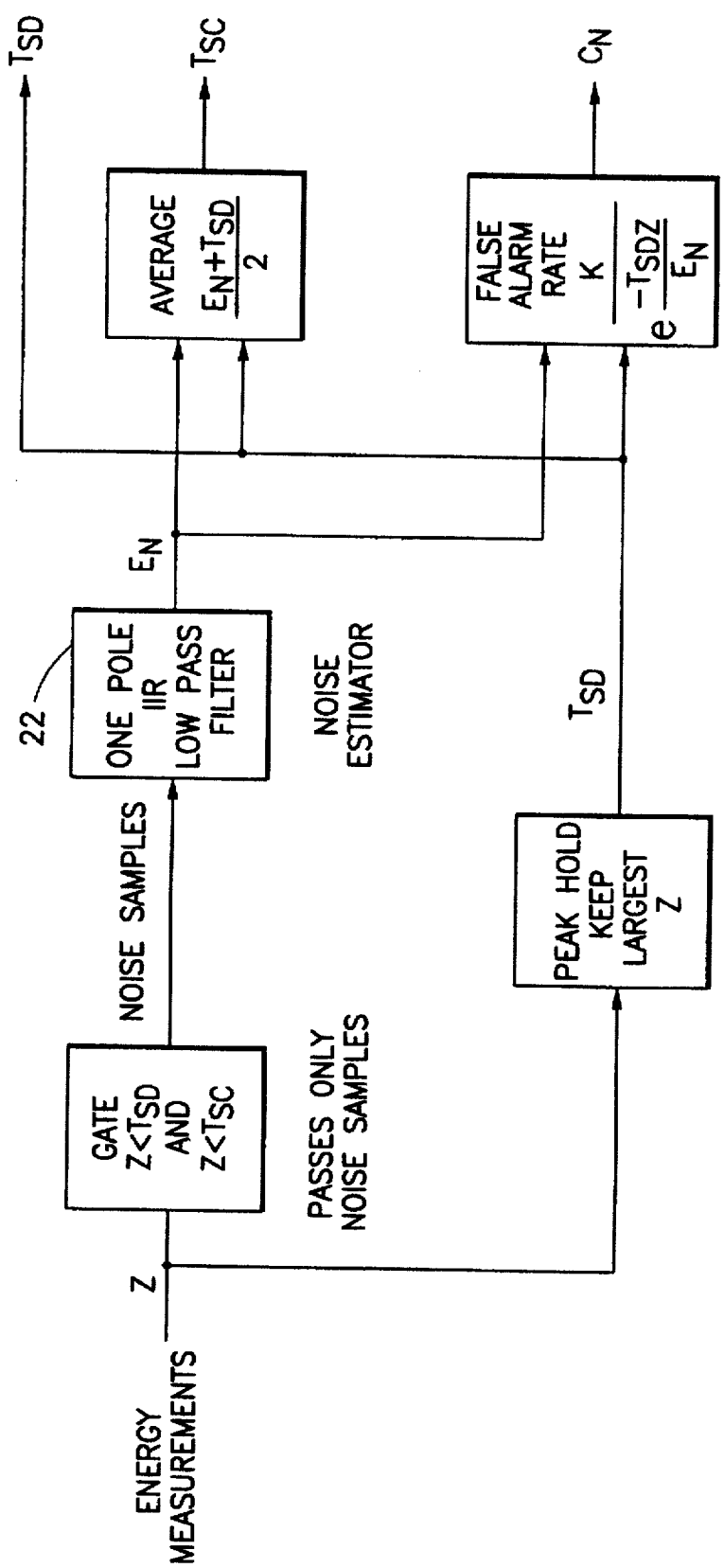
FIG. 6 illustrates the data flow for calculating the noise estimate, $E_N$, and the signal detection and signal classification thresholds, $T_{SD}$ and $T_{SC}$.
Figure 7:
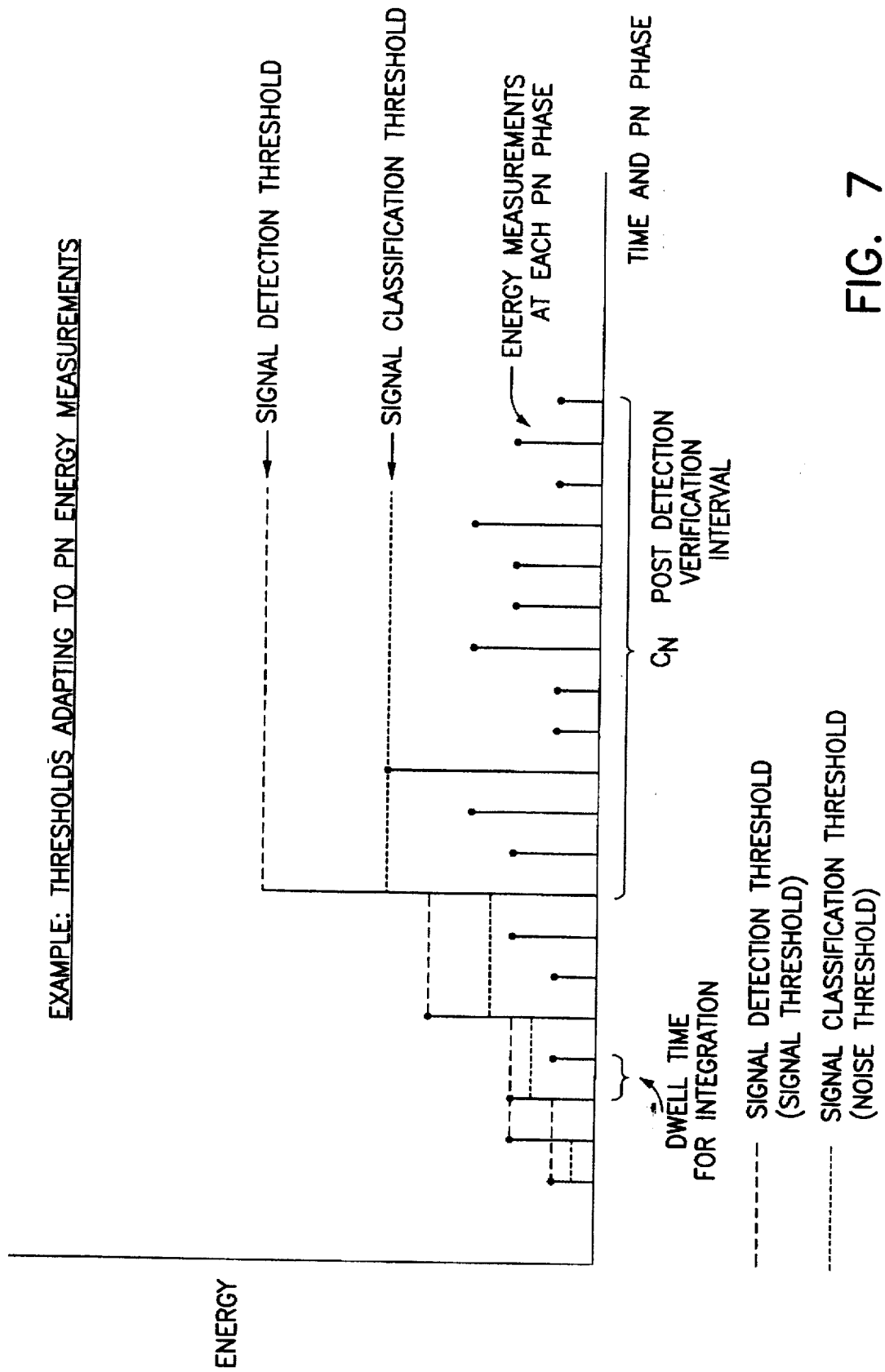
FIG. 7 illustrates an example sequence of signal energy measurements showing the signal detection and signal classification thresholds adapting to the received signal energy measurements.

In the event that comparator 14 outputs a YES signal, thereupon, the value $Z_1$ of the current output of integrator 12 is compared in comparator 24 with the first signal detection threshold $T_{SD1}$. If the integrator's current output $Z_1$, upon comparison in comparator 24, exceeds the value of the first signal detection threshold $T_{SD1}$, the first signal detection threshold $T_{SD1}$ is updated and increased by being replaced with the value of the output $Z_1$ of the integrator 12 in update block 13. Also, the value of the first signal classification threshold $T_{SC1}$ is updated by being replaced with the average value of the updated $T_{SD1}$ and the noise estimate $E_N$ obtained at the output of the noise estimator 22. (The data flow for the PN energy measurement updating of the noise estimate $E_N$ and signal detection $T_{SD}$ and signal classification $T_{SC}$ thresholds is illustrated in FIG. 6, and the threshold adapting to the PN energy measurements is illustrated in FIG. 7.) If the integrator output $Z_1$ exceeds the first signal detection threshold $T_{SD1}$ times $(1-y)$, but is less than the threshold $T_{SD1}$, no threshold will be updated.

Whether or not the thresholds are updated, when comparator 14 outputs a YES signal, a NO signal will be output from comparator 24 or a signal will be output from update box 13 to key the operation of the second integrator 26. Then, without changing the existing PN code phase, the integration (dwell) time is increased to $\tau_2$ seconds and an appropriate integration is performed in the second integrator 26 to begin the second dwell stage. The second dwell provides both a higher probability of detection and a lower probability of false alarms. The initial thresholds $T_{SD2}$ and $T_{SC2}$ for the second dwell stage are determined in the same manner as those of the first dwell stage.

To begin with, if the second signal detection threshold $T_{SD2}$ is exceeded by the output $Z_2$ of integrator 26, upon comparison in comparator 28, $T_{SD2}$ is replaced with the value of the current output $Z_2$ in update block 15. This is an indication that the correct cell candidate has been detected and there is then a need, for reliability confirmation, to count the number of incorrect cells after the correct cell candidate, i.e., perform the post detection verification process. (The PN phase, i, is stored in variable $P_o$, the PN phase of the candidate with the highest energy, which is recalled when acquisition is done and set at this point to begin the tracking mode.) Accordingly, the signal classification threshold $T_{SC2}$ and the noisy bin counter threshold $C_N$ are updated as will be more fully described below in connection with FIG. 3. Then noisy bin counter count $c_n$ is initialized to zero in reset block 17, and whether the end of the PN space has been reached is checked at comparator block 19. If i=q, then searching is stopped. If i≠q, then the phase i of the locally generated PN code signal is changed by a fraction of a chip in block 21, and the correlation is reexamined to count the number of incorrect cells after the correct cell candidate.

If the second signal detection threshold $T_{SD2}$ is not exceeded by the output $Z_2$, the acquisition system compares, in comparator 29, the present integrator output $Z_2$ with the signal classification threshold $T_{SC2}$, which is the optimal threshold between the noise estimate $E_N$ and signal detection threshold $T_{SD2}$. Then, if the present integrator output $Z_2$ exceeds the signal classification threshold $T_{SC2}$, the system will reset the noisy bin counter count $c_n$ to zero, the phase i of the locally generated code signal is changed by a fraction of a chip, and the correlation is reexamined, again to count the number of incorrect cells after the correct cell candidate.

However, if the signal energy of output $Z_2$ does not exceed the signal classification threshold $T_{SC2}$, a NO signal is output by comparator 29 to block 23 which sends an updating signal to noise estimator 22. Noise estimator 22, being a one-pole IIR low pass filter, averages signal energy measurements from integrator outputs $Z_1$ or $Z_2$ as indicated by the comparison with signal classification thresholds $T_{SC1}$ or $T_{SC2}$. The noise statistics having been updated by means of the NO signal from comparator 29 to block 23, the system increases the noisy bin counter count $c_n$ by 1, in response to the NO signal, and then compares it with the threshold $C_N$ in comparator 18. When the noisy bin counter count $c_n$ exceeds the threshold $C_N$, the acquisition system stops the search process indicating that the acquisition system has evaluated a reasonable number of the noisy bins (or incorrect cells) after it obtained a reliable signal (or correct cell candidate). Otherwise, if the noisy bin counter count $c_n$ does not exceed the threshold $C_N$, the noise statistics having been updated, the search process is continued, using the updated noise statistics and the updated thresholds for the first dwell as well. The NO signal from comparator 18 causes comparator 19 to check whether i=q. If YES, then searching is stopped. If NO, then phase i of the locally generated PN code signal is changed by a fraction of a chip and the PN phase correlation is reexamined, which process continues until the noisy bin counter count $c_n$ exceeds the threshold $C_N$ or i=q.

The reliable acquisition phase or correct PN alignment is chosen as the local PN code phase position which produced the maximum detector output, i.e., the maximum signal energy output, during the search period. Thus, if a larger detector output is produced during the post detection verification period, the corresponding cell is actually the correct cell rather than the cell first detected as such.

System initialization is achieved as follows. When the system is first activated upon receipt of a PN code signal, thresholds $T_{SD1}$ and $T_{SC1}$ are both reset to zero, so that the first comparison in comparator 14 results in the YES path being taken to comparator 24 and then to the update block 13 where threshold $T_{SD1}$ is initialized to the value of $Z_1$. Similarly, when the second integrator 26 is then employed the result of the comparison in comparator 28 results in the YES path being taken to the update block 15 where the threshold $T_{SD2}$ is initialized to $Z_2$. At the noisy bin counter 20, the count $c_n$ is initialized to zero, and the next PN code phase i is set at block 21. As a result, after the first PN code of the PN code space is sampled the system has automatically initialized itself and is ready to begin the detection process.

It will accordingly be seen that the received input PN signal is serially correlated with all possible code positions of the local PN code replica, and the corresponding threshold values and the maximum detector output are updated whenever the detector output exceeds the signal detection threshold value until the correlated output satisfies the necessary condition to stop the search. At the end of this test or after termination of the search process, the correct PN alignment is chosen as the local PN code phase position which produced the maximum detector output during the search period.

SYSTEM PARAMETER DESIGN

Figure 3:
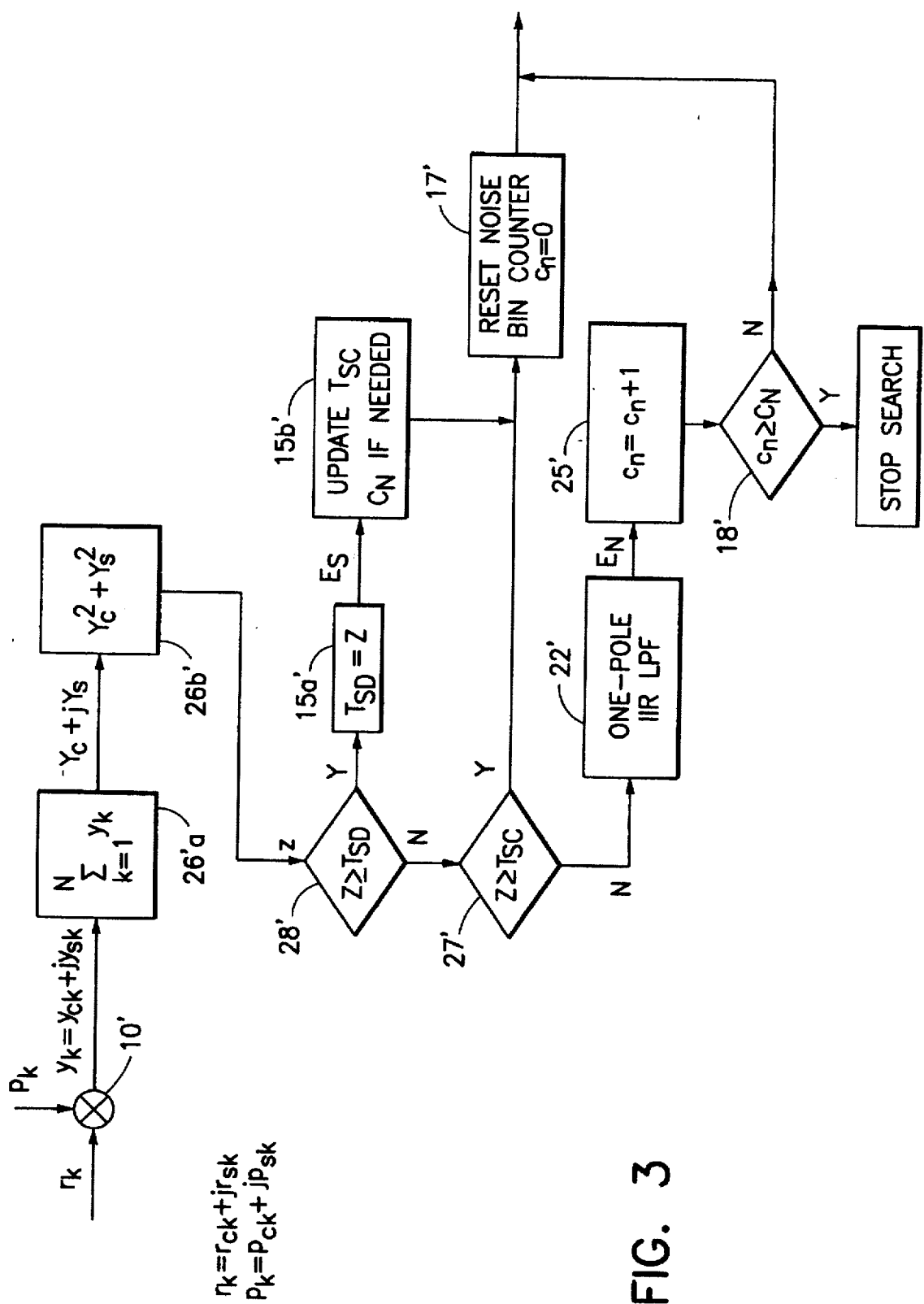
FIG. 3 is a block diagram functionally illustrating a system for signal and noise estimation using a complex signal detector in a discrete system in accordance with the present invention.

The key system parameters of the acquisition algorithm of the invention are the signal classification threshold, $T_{SC}$, and the number, $C_N$, of incorrect cells to be tested after detecting a signal candidate which calls for stopping of the search process. FIG. 3 shows a general form of the particular system shown in FIG. 2, that will now be used to describe the design approach of the acquisition system and algorithm of the invention. Accordingly, FIG. 3 illustrates a functional block diagram for signal and noise estimation using a complex signal detector, which outputs correlator output energy z, in a discrete system. The system components are generally related to corresponding components in the FIG. 2 system by the use of similar number designations with added primes.

As mentioned above, there are two thresholds, $T_{SD}$ and $T_{SC}$, in each dwell. The following system parameter design approach is applied to both dwells. As can be seen by referring to FIG. 3, whenever the signal detection threshold $T_{SD}$ is exceeded by the correlator output energy z, the two thresholds are updated as follows. The signal detection threshold $T_{SD}$ is replaced by the energy of the correlator output z. The signal classification threshold $T_{SC}$ is replaced by the average of the updated $T_{SD}$ and the noise estimate $E_N$ (i.e., $T_{SC}=(T_{SD}+E_N)/2$). If the correlator output energy z is less than $T_{SD}$ and signal classification threshold $T_{SC}$, the energy is fed into the noise estimator 22' and its output is noise estimate $E_N$.

Whenever the signal detection threshold $T_{SD}$ is exceeded by the correlator output energy z from the second dwell, the noisy bin counter threshold $C_N$ is updated to increase the post detection verification period. The threshold $C_N$, i.e., the number of incorrect cells to be tested for the post detection verification process can be estimated as one or two times the false alarm rate depending upon the false alarm probability. The false alarm rate, which is proportional to the false alarm probability, is calculated by using the correlator output energy z and the noise estimate $E_N$, and the threshold $C_N$ is determined, as follows:

1) calculate the false alarm probability $P_F$ using the following relationships $P_F(T_{SC})=\exp(-T_{SC}/E_N)$;

2) the threshold $C_N$ can be obtained by $$C_{TH} = \frac{K}{P_F(T_{SC})}$$

where $k=1$ or 2.

The details of the calculation of false alarm rate due to the classification threshold in keeping with the design approach of the invention may be carried out as will now be explained with reference to FIG. 4 which depicts a general form of a complex signal detector such as shown in FIG. 3. The approach is also applicable to designing the acquisition system of the invention with any form of detector.

Figure 4:
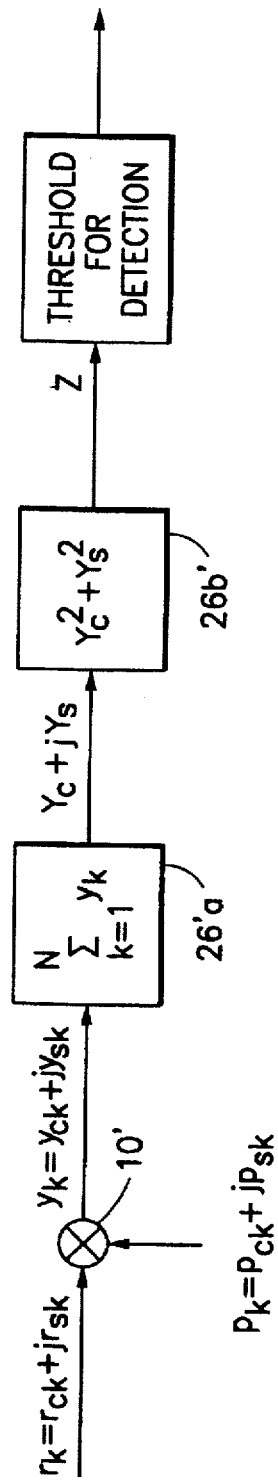
FIG. 4 is a block diagram illustrating a general form of complex signal detector in accordance with the present invention.

As seen in FIG. 4, the input signal to the receiver, $r_k$, is multiplied by the local PN code signal $p_k$ and the multiplied output, $y_k$, is coherently integrated over N chips. The received signal $r_k$ and the locally generated PN signal $p_k$ can be modeled as follows:

$$r_k = s_{k+\epsilon} + n_k \text{ and } p_k = s_{k+2},$$

where $s_{k+\epsilon}$ is the transmitted PN signal and $n_k$ is noise. The subscript $\epsilon$ is the offset of the transmitted PN signal. Their multiplied output $y_k$ can be modeled by:

$$y_k = A_k + n_k = y_{ck} + jy_{sk} = (A_{ck} + n_{ck}) + j(A_{sk} + n_{sk}) \quad (1)$$

for a synchronization hypothesis ($=H_1$), i.e., $\epsilon = \hat{\epsilon}$; and $$y_k = n_k = y_{ck} + jy_{sk} = n_{ck} + jn_{sk} \quad (2)$$

for a non-synchronization hypothesis ($=H_0$), i.e., $\epsilon \neq \hat{\epsilon}$. The subscripts c and s represent the real and imaginary parts of the signal, respectively, and the subscript k represents the $k^{th}$ sample in the coherent integration period. $n_{ck}$ and $n_{sk}$ are zero mean gaussian random variables with variance $\sigma_n^2 = N_o/2$, and $A^2 = E_c$, where $E_c$ is the energy per chip. Note that $y_{ck}$ and $y_{sk}$ are gaussian random variables with variance $\sigma_n^2$ and have two mean values depending on the hypothesis ($H_1$ or $H_0$). The integration of $y_k$ over N chips yields $$Y = Y_c + jY_s = \sum_{k=1}^{N} y_{ck} + j \sum_{k=1}^{N} y_{sk} \quad (3)$$

where $Y_c$ and $Y_s$ are gaussian random variables with mean value of NA or zero, depending upon the hypothesis the signal belongs to, and variance of $\sigma^2 = N\sigma_n^2$. The energy at the output of the square law envelope estimator 26'b, to which Y is input, is given by $$z = Y_c^2 + Y_s^2 \quad (4)$$

Since $Y_c$ and $Y_s$ are statistically independent and identically distributed gaussian random variables, the energy z has a non central (for hypothesis $H_1$) or central (for hypothesis $H_0$) chi-square distribution with two degrees of freedom. For a hypothesis $H_1$ cell, the probability density function (pdf) of the energy z is given as $$p(z|H_1) = \frac{1}{2\sigma^2} \exp\left(-\frac{z+s^2}{2\sigma^2}\right) I_0\left(\frac{s\sqrt{z}}{\sigma^2}\right) \quad (5)$$

where $$s^2 = 2N^2A^2 \text{ and } \sigma^2 = N\sigma_n^2 \quad (6)$$

The mean value of the energy z:

$$E(z|H_1) = 2\sigma^2 + s^2 \quad (7)$$

and $I_0(.)$ is the zero order modified Bessel function of the first kind. The probability of missing a pilot signal after the integration is given by $$F_m(z) = \int_0^z p_x(x|H_1)dx = 1 - Q_1\left(\frac{s}{\sigma}, \frac{\sqrt{z}}{\sigma}\right) = 1 - \quad (8)$$

$$Q_1\left(\frac{\sqrt{2NE_c^2}}{\sigma_n}, \frac{\sqrt{z}}{\sqrt{N}\sigma_n}\right)$$

where $Q_n(.)$ is the generalized Marcum Q function.

For the hypothesis $H_0$ cell, the probability density function (pdf) of the energy z is given by $$p(z|H_0) = \frac{1}{2\sigma^2} \exp\left(-\frac{z}{2\sigma^2}\right) \quad (9)$$

The mean value of the energy z:

$$E(z|H_0) = 2\sigma^2 \quad (10)$$

The probability of false alarm after the integration is given by $$F_F(z) = \int_z^{\infty} p_x(x|H_0)dx = \exp\left(-\frac{z}{2\sigma^2}\right) \quad (11)$$

The optimal threshold can be obtained by the value of z which makes the missing probability of Eq.(8) equal to the false alarm probability of Eq.(11). However, this procedure is not practical for real time application. Instead, a heuristic approach is used for setting the threshold for real time application.

Referring back to the acquisition system operation described above, the signal energy (or the maximum integrator output) is obtained as the signal detection threshold, and the noise energy is obtained at the output of the noise average filter (estimator 22 or 22'). The signal energy detected by the signal detector is an instantaneous signal energy and is used as the rough estimate of the signal energy z of Eq.(7). The energy of the noisy signal at the output of the noise average filter is the estimate of the noisy signal energy z of Eq.(10). The real time adaptive signal classification threshold $T_{SC}$ is obtained as the average of the signal energy estimate and the noise energy estimate.

$$T_{SC} = \frac{1}{2} \left( E\left( z|H_1 \right) + E(z|H_0) \right) = \frac{1}{2} (4\sigma^2 + s^2) = 2\sigma^2 + s^2 \quad (12)$$

The corresponding false alarm probability can be obtained by using the threshold $T_{SC}$ of Eq.(12) in place of the z in Eq.(11).

$$p_F(T_{SC}) \equiv \quad (13)$$

$$p_{FA} = \int_{T_{SC}}^{\infty} p_z(x|H_0)dx =$$

$$\exp\left( -\frac{2\sigma^2 + s^2}{2\sigma^2} \right) = \exp\left( -1 - \frac{SNR}{2} \right)$$

The SNR estimate can be obtained by using the signal energy estimate, $T_{SD}$, of Eq.(7) and the noisy signal energy estimate $E(z|H_0)$ of Eq.(10).

$$\frac{SNR}{2} = \frac{T_{SD}}{E(z|H_0)} - 1 \quad (14)$$

Thus, with the estimated SNR and its corresponding signal classification threshold $T_{SC}$, a false alarm event will happen at every false alarm rate, which is proportional to the false alarm probability. Correspondingly, the number of incorrect cells, $C_N$, to be tested after signal detection for post detection verification can be estimated as one or two times the false alarm rate, as noted above, depending upon the false alarm probability.

$$C_N = \frac{k}{P_F(T_{SC})} \quad (15)$$

Upon consideration of the foregoing descriptions and explanations, it will be seen that the acquisition system of the invention has a combined structure devised from the maximum likelihood and the serial sliding acquisition systems and it takes advantage of the strong points of both acquisition systems. The advantages of this new system when compared with the serial sliding acquisition system are as follows:

1. It always obtains a very reliable signal level;
2. It achieves better acquisition performance by at least 6 dB over prior optimal threshold acquisition systems; and
3. It sets the most robust threshold automatically in a given communication environment without using a predetermined threshold.

The advantages of this new acquisition system when compared with the maximum likelihood acquisition system are as follows:

1. It will Stop the search process after obtaining a reliable signal without waiting for the entire PN space to be searched; and
2. It further reduces the acquisition time.

The advantage of this new acquisition system when compared with the system of the above-cited co-pending patent application are as follows:

1. It has a more reliable and controllable capability in setting a threshold because of the availability of a real time SNR estimate; and
2. It has more flexibility in taking the trade offs between the false alarm probability (correspondingly its penalty time) and detection time by exploiting the SNR and its corresponding false alarm rate.

The employment of two integration intervals in a given cell examination period will increase toward its maximum value in two steps. This acquisition system dismisses an incorrect alignment earlier than would be possible in a single dwell acquisition system which is constrained to integrate over the full examination interval. Since most of the cells searched correspond to incorrect alignment, the ability to quickly eliminate them produces a considerable reduction in acquisition time, particularly for long codes. In addition to the double integration interval, the employment of the continuous decision making process further reduces the acquisition time.

While the description of the invention has focused on a double dwell acquisition system, it will be appreciated that the invention can be extended to a multiple dwell acquisition system which will further reduce the acquisition time and improve the performance of the system.

Figure 8:
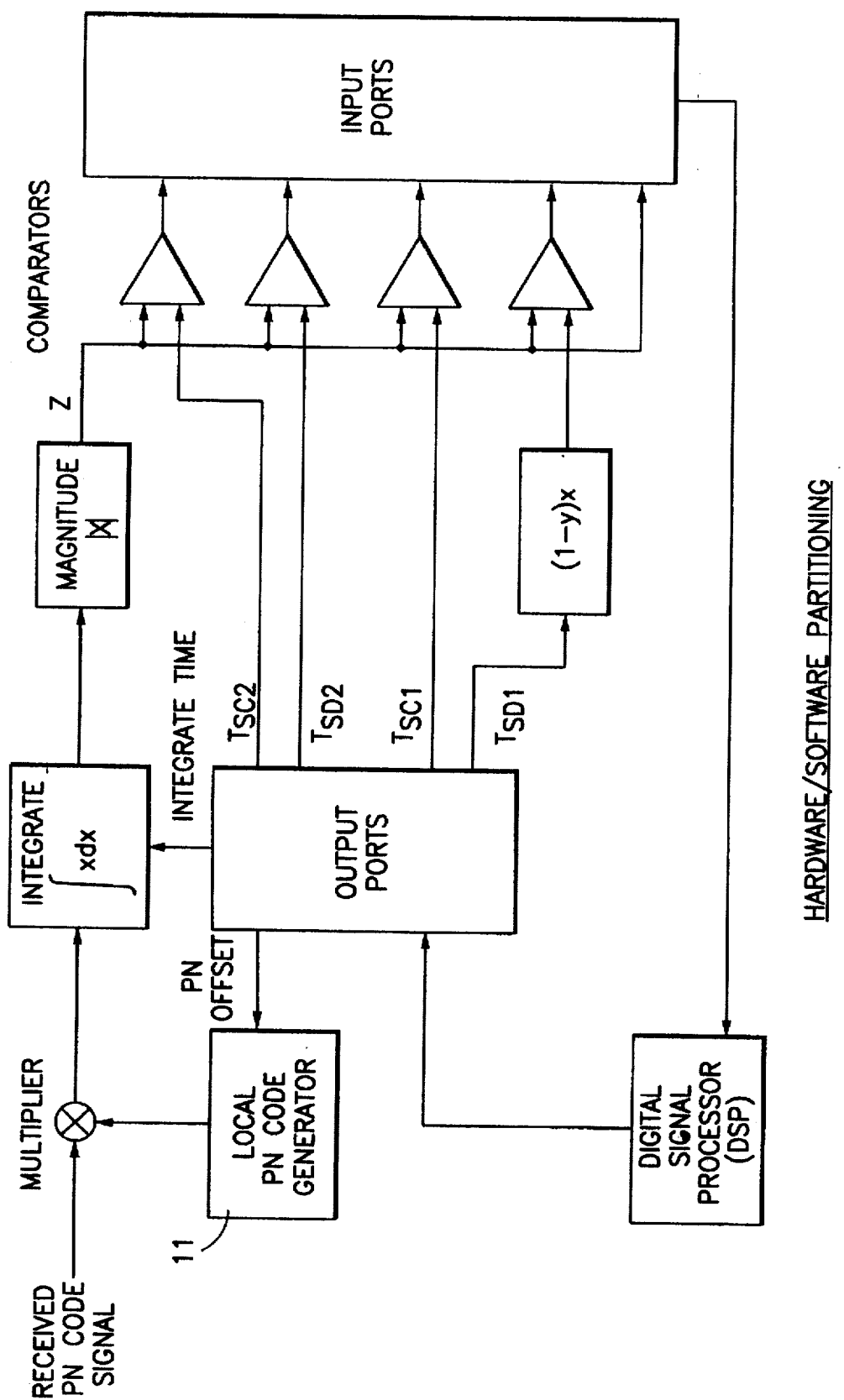
FIG. 8 illustrates an exemplary hardware and software partitioning of the preferred embodiment.
Figure 9:
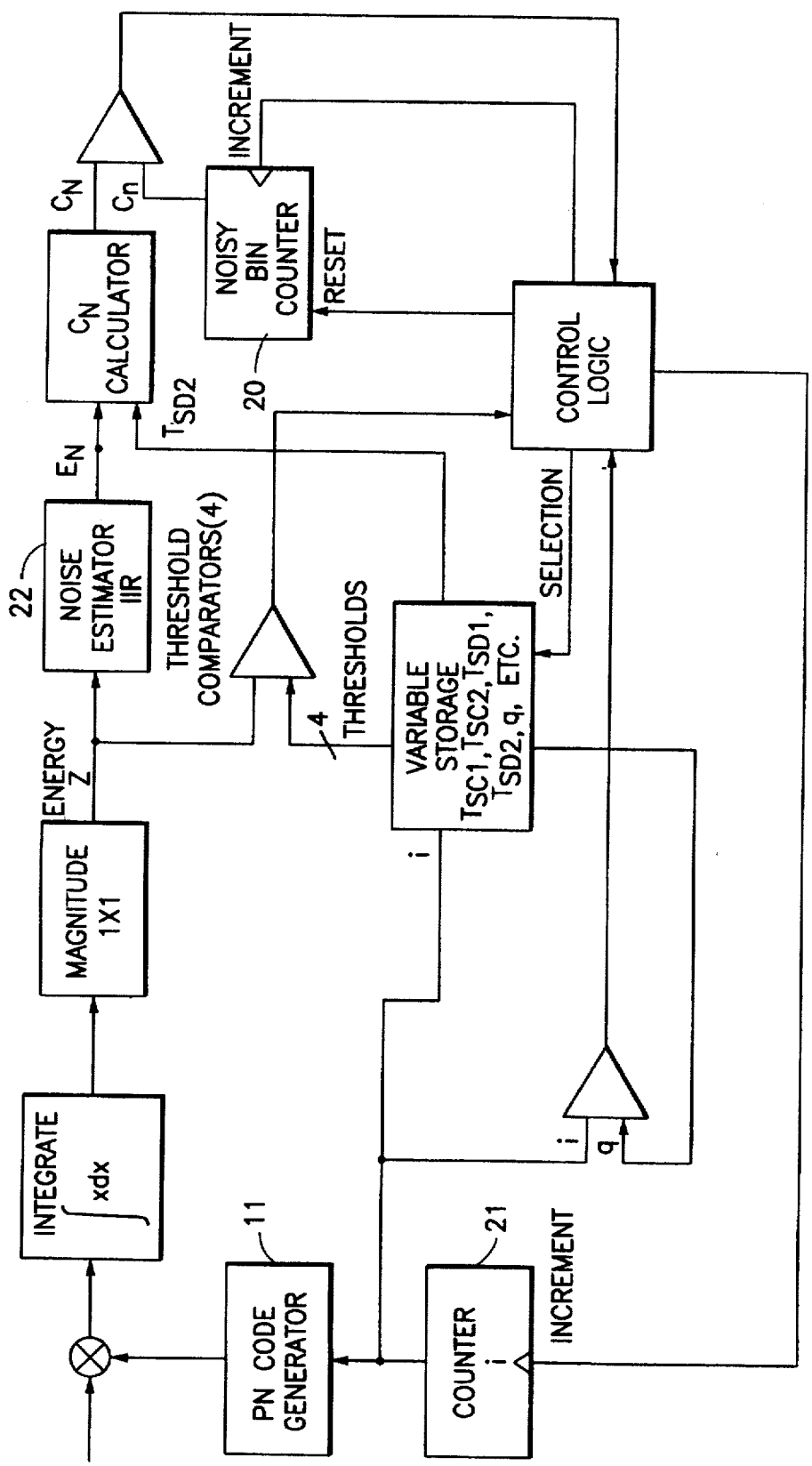
FIG. 9 is a block diagram illustrating an exemplary arrangement of operating components of the preferred embodiment.

The system and method of the invention may be implemented with discrete circuit elements, or in software using routines that are executed by a suitable digital data processor, such as a high speed signal processor, or by a combination of circuit hardware and software. The determination of the optimum implementation for a given application and the range of applications will be within the purview of those skilled in the art in the light of the foregoing description, so that the scope of the invention should not be limited solely to the exemplary embodiments of this specification. Accordingly, by way of example, a hardware/software partitioning of the preferred embodiment is shown in FIG. 8 and a block diagram of operating components for the preferred embodiment is presented in FIG. 9.

What is claimed is:

1. A method for PN code acquisition in a PN code signal transmitted in a Code Division Multiple Access (CDMA) Direct Sequence Spread Spectrum (DSSS) system, comprising the steps of:

receiving a transmitted PN code signal and multiplying said signal with a PN code replica signal to produce an input signal for use in determining the phase alignment of said PN code signals;

integrating the signal energy of said input signal over a time interval to obtain a first result;

establishing a noise estimate;

establishing a signal detection threshold having a value greater than that of said noise estimate;

establishing a signal classification threshold, having a value between that of said signal detection threshold and said noise estimate;

establishing a first number $C_N$ of PN phases i to be searched and a total number q of PN phases for said PN code replica signal;

maintaining a count $c_n$ of said PN phases i; and searching for said alignment by detecting the signal energy levels and the noise levels of said input signal by the steps of:

evaluating whether said first result is equal to or exceeds the value of said signal detection threshold;

if NO, evaluating whether said first result exceeds the value of said signal classification threshold; and if NO, updating the value of said noise estimate with the value of said first result and updating said count $c_n$ by 1, and determining whether said updated count is equal to or exceeds $C_N$;

if YES, ending the search;
if NO, determining whether the PN phase i of said PN code replica signal equals q;
if YES, ending the search;
if NO, updating the PN phase i of said PN code replica signal by 1, and continuing the search by repeating the foregoing steps using the phase updated PN code replica signal to multiply said transmitted PN code signal;
if YES, resetting said count $c_n$ to 0, and determining whether the PN phase i of said PN code replica equals q;
if YES, ending the search;
if NO, updating the PN phase i of said PN code replica signal by 1, and continuing the search by repeating the foregoing steps using the phase updated PN code replica signal to multiply said transmitted PN code signal.

2. The method of claim 1 wherein said signal detection threshold comprises a first signal detection value $T_{SD1}$ multiplied by (1−y), where $T_{SD1}$ is the maximum integrated signal energy of said input signal obtained from past history till i−1, said first result is obtained at time t and phase i, and y is between 1/16 and 1/8; and further comprising the steps of:

if said first result exceeds said signal detection threshold, then evaluating whether said first result exceeds said first signal detection value $T_{SD1}$;
if YES, changing said first signal detection value $T_{SD1}$ to an updated signal detection value equal to said first result, and updating the value $T_{SC1}$ of said signal classification threshold to an updated signal classification threshold value equal to the average of said updated signal detection value and said noise estimate value;
if NO, equating said updated signal detection value to said first signal detection value $T_{SD1}$ and equating said updated signal classification threshold value to said first signal classification threshold value $T_{SC1}$;
integrating the signal energy of said input signal over a second time interval to obtain a second result;
evaluating whether said second result is equal to or exceeds a second signal detection threshold value
if NO, evaluating whether said second result exceeds the value of a second signal classification threshold value $T_{SC2}$; and
if NO, updating the value of said noise estimate with the value of said second result and updating said count $c_n$ by 1, and determining whether said updated count is equal to or greater than $C_N$;
if YES, ending the search;
if NO, determining whether the PN phase i of said PN code replica signal equals q;
if YES, ending the search;
if NO, updating the PN phase i of said PN code replica signal by 1, and continuing the search by repeating the foregoing steps using the phase updated PN code replica signal to multiply said transmitted PN code signal;
if YES, resetting said count $c_n$ to 0, and determining whether the PN phase i of said PN code replica equals q;
if YES, ending the search;
if NO, updating the PN phase i of said PN code replica signal by 1, and continuing the search by repeating the foregoing steps using the phase updated PN code replica signal to multiply said transmitted PN code signal.

3. The method of claim 2 wherein said number $C_N$ of PN phases to be searched, is determined by the steps of:

1) calculating false alarm probability $P_F$ using the relationship $(P_F(T_{SC}) = \exp(-T_{SC}/EN)$,
where $T_{SC}$ is said updated signal classification threshold value, and $E_N$ is said noise estimate; and 2) obtaining $C_N$ using $$C_{TH} = \frac{K}{P_F(T_{SC})}$$

where k=1 or 2.

4. The method of claim 2 further comprising, when said second result exceeds said second signal detection threshold value $T_{SD2}$, the steps of updating said number $C_N$ and resetting said count $c_n$ to 0.

5. The method of claim 1 wherein said signal detection threshold comprises a first signal detection threshold value times (1−y), where y is between 1/16 and 1/8, and said step of evaluating whether said first result exceeds said signal detection threshold comprises the steps of:

evaluating whether said first result exceeds said first signal detection threshold value times (1−y); and,
if YES, evaluating whether said first result exceeds said first signal detection threshold value;
if YES, changing said first signal detection threshold value to an updated signal detection threshold value equal to said first result, and updating said signal classification threshold to an updated signal classification threshold value equal to the average of said updated signal detection threshold value and said noise estimate;
if NO, retaining said first signal detection threshold value and said signal classification threshold as an updated signal detection threshold value and an updated signal classification threshold value, respectively; and further comprising the steps of:

integrating the signal energy of said input signal over a second predetermined time period to obtain a second result;
comparing the value of said second result to a second signal detection threshold value; and,
if said second result value is less than said second signal detection threshold value, then, comparing said second result value to a second signal classification threshold value; and
if said second result value is less than said second signal classification threshold value, then,
updating said noise estimate and said phase count $c_n$;
comparing said updated phase count value with said first number of phases to be searched $C_N$; and
if said updated phase count value is equal to or greater than said first number of phases $C_N$, ending the search; else,
if the total number q of phases in said PN space has not been reached, updating the phase i of said local PN code signal, and then repeating said PN code signals combining step, said integrating step, and said comparing steps with the updated values;
if said total number q is reached, ending the search;
if said second result value is equal to or greater than said second signal detection threshold value, then,
changing said second signal detection threshold value to the value of said second result, and updating said second signal classification threshold value to a value equal to the average of the sum of the value of said second result and said noise estimate value, and updating said number of phases to be searched $C_N$, and then, setting said count $c_n$ of said PN phases to zero; and, if the total number q of phases in said PN space has not been reached, updating the phase i of said local PN code signal, and then repeating said PN code signals combining step, said integrating step, and said comparing steps with the updated values; else, ending the search.

6. In an apparatus for PN code acquisition for CDMA-DSSS systems comprising:

means for receiving a transmitted PN code signal and multiplying said signal with a PN code replica signal to produce an input signal for use in determining the phase alignment of said PN code signals;

means for integrating the signal energy of said input signal over a time interval and producing an energy level output signal;

signal energy detector means for using said energy level output signal to determine a signal level threshold and producing a signal indicative of said threshold;

the improvement comprising:

a noise energy level estimator for producing a noise estimate signal;

signal classification means for using said signal level threshold signal and said noise estimate signal to produce a signal classification threshold;

comparator means for comparing said energy level output signal to said signal classification threshold and for producing a first signal when said energy level output signal is smaller and a second signal when it is not;

means, responsive to said first signal, for making said noise estimate signal equal to said energy level output signal; and means, responsive to said second signal, for changing the phase of said PN code replica signal.

7. The apparatus as in claim 6 wherein said means for changing the phase of said PN code replica signal comprises:

means for storing a first number $C_N$ of PN phases i to be searched and a total number q of PN phases;

counter means for maintaining a count $c_n$ of said PN phases searched and producing a count signal in accordance therewith;

means for updating said count $c_n$ by 1 in response to said second signal from said comparator means; and means for comparing the value of said count signal with said number $C_N$ and ending said search when said count signal value equals or exceeds $C_N$ and for changing the phase of said PN code replica signal when it does not.

8. The apparatus as in claim 6 further comprising means for determining the number of PN phases to be searched, $C_N$, including:

means for calculating false alarm probability $P_F$ using the relationship $(P_F(T_{SC})=\exp(-T_{SC}/E_N)$, where $T_{SC}$ is said signal classification threshold, and $E_N$ is the value of said noise estimate signal; and means for obtaining $C_N$ by $$C_{TH} = \frac{K}{P_F(T_{SC})}$$

where k=1 or 2.

9. A method for searching a pseudorandom noise (PN) code space containing a total number q of PN chips or phases i, comprising the steps of:

predetermining values for:
   a first number of PN phases to be searched, $C_N$;
   a first signal detection threshold, $T_{SD1}$;
   a first noise estimate, $E_N$; and
   a first signal classification threshold, $T_{SC1}$, having a value between said first signal detection threshold and said first noise estimate;

maintaining a count $c_n$ of said PN phases; and (a) combining a received PN code signal with a first local PN code signal to obtain an input signal;

(b) integrating the signal energy of said input signal over a first predetermined time period $\tau_1$ to obtain a first result $Z_1$;

(c) comparing the value of said first result $Z_1$ to said first signal detection threshold $T_{SD1}$ value times (1–y), where y is between 1/16 and 1/8; and, (i) if said first result $Z_1$ value is less than said first signal detection threshold $T_{SD1}$ value times (1–y), comparing said first result $Z_1$ value to said first signal classification threshold $T_{SC1}$ value;

(1) if said first result $Z_1$ value is less than said first signal classification threshold $T_{SC1}$ value; then, updating the values of said first noise estimate $E_N$ and said phase count $c_n$;

comparing the updated phase count value with said first number of phases to be searched $C_N$; and if said updated phase count value is equal to or greater than said first number of phases $C_N$, ending the search; else, if the total number of phases q in said PN space has not been reached, updating the phase i of said local PN code signal, and then repeating said (a,b,c) combining, integrating, and comparing steps with said updated values;

if said total number of phases q is passed, ending the search;

(2) if the value of said first result $Z_1$ is equal to or greater than said first signal classification threshold $T_{SC1}$, value, then, setting said count $c_n$ of said PN phases to zero; and, if said total number of phases q in said PN space has not been reached, updating the phase i of said local PN code signal; and then repeating said (a,b,c) combining, integrating, and comparing steps with said updated values;

if said total number of phases q is passed, ending the search;

(ii) if the value of said first result $Z_1$ is equal to or greater than said first signal detection threshold $T_{SD1}$ value times (1–y), comparing said first result value to said first signal detection threshold $T_{SD1}$ value; and, if said first result value is greater than said first signal detection threshold value, then, changing said first signal detection threshold value to the value of said first result $Z_1$, and updating said first signal classification threshold $T_{SC1}$ value to a value equal to the average of said updated signal detection threshold value and said first noise estimate $E_N$ value; else, retaining said first threshold $T_{SD1}$ and $T_{SC1}$ values as said updated threshold values; and (d) integrating the signal energy of said input signal over a second predetermined time period $\tau_2$ to obtain a second result $Z_2$;

(e) comparing the value of said second result $Z_2$ to a second signal detection threshold $T_{SD2}$ value; and, (i) if said second result $Z_2$ value is less than said second signal detection threshold $T_{SD2}$ value, then, comparing said second result $Z_2$ value to a second signal classification threshold $T_{SC2}$ value; and if said second result $Z_2$ value is less than said second signal classification threshold $T_{SC2}$ value, then, updating the value of said first noise estimate $E_N$ and said phase count $c_n$;

comparing said updated phase count $c_n$ value with said first number of phases to be searched $C_N$; and if said updated phase count $c_n$ value is equal to or greater than said first number of phases $C_N$, ending the search; else, if the total number q of phases in said PN space has not been reached, updating the phase i of said local PN code signal, and then repeating said (a,d,e) combining, integrating, and comparing steps with the updated values;

if said total number q is passed, ending the search;

(ii) if the value of said second result $Z_2$ is equal to or greater than said second signal detection threshold $T_{SD2}$ value, then, changing said second signal detection threshold $T_{SD2}$ value to the value of said second result $Z_2$, and updating said second signal classification threshold $T_{SC2}$ value to a value equal to the average of the values of said second result $Z_2$ and said first noise estimate $E_N$, and updating said first number of phases to be searched $C_N$;

and then, setting said count $c_n$ of said PN phases to zero; and, if said total number q of phases in said PN space has not been reached, updating the phase i of said local PN code signal, and then repeating said (a,d,e) combining, integrating, and comparing steps with updated values; else, ending the search.

10. The method of claim 9 wherein when said first result $Z_1$ value is less than said first signal classification threshold $T_{SC1}$ value, the updated value of said first noise estimate $E_N$ comprises said first result $Z_1$ value.

11. The method of claim 9 wherein when said second result $Z_2$ value is less than said second signal classification threshold $T_{SC2}$ value, the updated value of said first noise estimate $E_N$ comprises said second result $Z_2$ value.

12. The method of claim 9 wherein said number of phases to be searched $C_N$, is determined by the steps of:

1) calculating the false alarm probability $P_F$ using the relationships $(P_F(T_{SC2})=\exp(-T_{SC2}/E_N)$; and 2) obtaining $C_N$ by $$C_{TH} = \frac{K}{P_F(T_{SC2})}$$

where k=1 or 2.

13. An apparatus for PN code acquisition in CDMA-DSSS systems, with automatic decision threshold, comprising:

means for receiving a transmitted PN code signal and multiplying said signal with a PN code replica signal to produce an input signal for use in determining the phase alignment of said PN code signals;

means for integrating the signal energy of said input signal over a time interval to obtain a first result;

means for storing a noise estimate value;

means for storing a signal detection threshold value greater than said noise estimate value;

means for storing a signal classification threshold value between said signal detection threshold and said noise estimate values;

means for storing a first number $C_N$ of PN phases i to be searched and a total number q of PN phases;

means for maintaining a count $c_n$ of said PN phases; and means for searching for said alignment by detecting the signal energy levels and the noise levels of said input signal, comprising:

means for evaluating whether said first result exceeds said signal detection threshold and producing a first signal if YES and a second signal if NO;

means, responsive to said first signal, for setting the value of said signal detection threshold equal to said first result and updating said signal classification threshold to the average value of said first result and said noise estimate;

means, responsive to said second signal, for evaluating whether said first result exceeds said signal classification threshold and producing a third signal if NO and a fourth signal if YES;

means, responsive to said third signal, for updating the value of said noise estimate by the value of said first result and updating said count $c_n$ by 1, and determining whether said updated count is equal to or greater than $C_N$ and producing a fifth signal if YES and a sixth signal if NO;

means, responsive to said fifth signal, for ending the search;

means, responsive to said sixth signal, for updating the PN phase i of said PN code replica signal by 1, and determining whether said updated phase equals q, and producing a seventh signal if YES and an eighth signal if NO;

means, responsive to said seventh signal, for ending the search;

means, responsive to said eighth signal, for continuing the search by actuating said foregoing means to repeat the foregoing functional steps using the phase updated first result;

means, responsive to said fourth signal, for setting said count $c_n$ to zero; and means, responsive to the setting of said count $c_n$ to zero, for checking the PN phase i with respect to the total number q, and producing a ninth signal if the PN phase i is not equal to q, and a tenth signal if the PN phase i is equal to q;

means, responsive to said ninth signal, for updating the PN phase i of said PN code replica signal by 1, and continuing the search by actuating said searching means to repeat the foregoing functional operations using the phase updated first result; and means, responsive to said tenth signal, for ending the search.

14. The apparatus of claim 13 wherein said means for storing a noise estimate value comprises a noise energy level estimator.

15. The apparatus of claim 13 further comprising means for determining the number of PN phases to be searched, $C_N$, including:

means for calculating false alarm probability $P_F$ using the relationship $(P_F(T_{SC})=\exp(-T_{SC}/E_N))$, where $T_{SC}$ is said updated signal classification threshold, and $E_N$ is the value of said noise estimate signal; and means for obtaining $C_N$ using $$C_{TH} = \frac{K}{P_F(T_{SC})}$$

where k=1 or 2.

16. A CDMA-DSSS system for acquiring a transmitted PN code signal, comprising:

means for receiving a transmitted PN code signal;

means for producing a cross correlation between said received PN code signal and a locally generated PN code, to achieve phase alignment thereof, and outputting a cross correlation signal indicative thereof;

first comparator means for comparing said cross correlation signal with a signal detection threshold and producing a first signal if said cross correlation signal exceeds the signal detection threshold, and a second signal if it does not;

means, responsive to said first signal from said first comparator means, for updating said signal detection threshold to the value of said cross correlation signal;

second comparator means, responsive to said second signal from said first comparator means, for comparing said cross correlation signal with a signal classification threshold, having a value between said signal detection threshold and a noise estimate, and producing a first signal if said cross correlation signal exceeds the signal classification threshold, and a second signal if it does not;

means, responsive to said first signal from said second comparator means, for updating the phase of said locally generated PN code unless a first predetermined phase limit has been reached;

counter means for maintaining a count of the updated phases of said locally generated PN code;

means, responsive to said second signal from said second comparator means, for updating said noise estimate and comparing the count of the updated phases of said locally generated PN code in said counter means and a second predetermined phase limit, and updating the phase of said locally generated PN code unless said second predetermined phase limit has been reached; and means for ending the updating of the phase of said locally generated PN code when either said first or second predetermined phase limit is reached.

17. A system as in claim 16 further comprising means, responsive to said first signal from said second comparator means, for setting the count in said counter means to zero.

18. A system as in claim 17 further comprising means for setting the number of phases to be counted after said count in said counter means has been set to zero, and wherein said number is said second predetermined phase limit.

19. A method for searching a pseudorandom noise (PN) code space containing a total number of PN chips or phases, q, comprising the steps of:

predetermining a first number of PN phases to be searched $C_N$;

predetermining a first signal detection threshold $T_{SD}$ having a value comprising $T_{SD1}(1-y)$, y being between $\frac{1}{16}$ and $\frac{1}{8}$ and $T_{SD1}$ being a threshold value based on signal energy;

predetermining a first noise estimate $E_N$ having a value less than that of said threshold value $T_{SD1}$;

predetermining a first signal classification threshold $T_{SC}$, having a value $T_{SC1}$ between that of said threshold value $T_{SD1}$ and that of said first noise estimate $E_N$;

maintaining a count $c_n$ of said PN phases including a first phase count;

(a) combining a received PN code signal with a first local PN code signal, having a phase i, to obtain an input signal;

(b) integrating the signal energy of said input signal over a first predetermined time period to obtain a first result $Z_1$;

(c) comparing the value of said first result $Z_1$ to said first signal detection threshold $T_{SD}$ value, and, (i) if said first result $Z_1$ value is less than said first signal detection threshold $T_{SD}$ value, comparing said first result $Z_1$ value to said first signal classification threshold value $T_{SC1}$; and if said first result $Z_1$ value is less than said first signal classification threshold $T_{SC}$ value, then, updating said first noise estimate $E_N$ and said first phase count, and comparing said updated phase count with said first number of phases to be searched $C_N$, and if said updated phase count is equal to or greater than said first number $C_N$, ending the search; else, if the total number of phases q in said PN space has not been reached, updating the phase i of said local PN code signal, and then repeating said combining, integrating, and comparing steps with updated values;

when said total number of phases q is reached, ending the search;

(ii) if said first result $Z_1$ value is equal to or greater than said first signal detection threshold $T_{SD}$ value, comparing said first result $Z_1$ value to said threshold value $T_{SD1}$ and if said first result $Z_1$ value exceeds said threshold value $T_{SD1}$, setting said threshold value $T_{SD1}$ equal to said first result $Z_1$ and updating said first signal detection threshold value $T_{SD1}$ value to the average value of said first result $Z_1$ and said first noise estimate $E_N$; and (d) integrating the signal energy of said input signal over a second predetermined time period to obtain a second result $Z_2$;

(e) comparing the value of said second result $Z_2$ to a second signal detection threshold value $T_{SD2}$, and, if said second result $Z_2$ is equal to or greater than said second signal detection threshold value $T_{SD2}$, setting said second signal detection threshold value $T_{SD2}$ equal to said second result $Z_2$, resetting said PN phase count $c_n$ to zero, and if said total number of phases q has not been reached, updating the phase i of said local PN code signal and combining it with said received PN code signal, and repeating said integrating, and comparing steps for said second predetermined time period; and when said first number $C_N$, or said total number of phases q, has been reached, ending the search.

20. A method for searching a pseudorandom noise (PN) code space containing a total number q of PN chips or phases i, comprising the steps of:

predetermining values for:

a first number of PN phases to be searched $C_N$;

a first signal detection threshold $T_{SD}$;

a first noise estimate $E_N$; and a first signal classification threshold $T_{SC}$, having a value between that of said first signal detection threshold and that of said first noise estimate; and maintaining a count $c_n$ of said PN phases including a first phase count $c_{n1}$;

(a) combining a received PN code signal with a first local PN code signal, having a phase i, to obtain an input signal;

(b) integrating the signal energy of said input signal over a first predetermined time period to obtain a first result $Z_1$;

(c) comparing the value of said first result $Z_1$ to said first signal detection threshold value $T_{SD1}$ times (1−y), where y is between 1/16 and 1/8, and, (i) if said first result $Z_1$ is less than said first signal detection threshold value $T_{SD1}$ times (1−y), comparing said first result to said first signal classification threshold value $T_{SC1}$;

(1) if said first result $Z_1$ is less than said first signal classification threshold value $T_{SC1}$, then, updating said first noise estimate value $E_{N1}$ to $E_{N2}$ and said first phase count $c_{n1}$ to $c_{n2}$, and comparing said updated phase count $c_{n2}$ with said first number of phases $C_N$ to be searched, and if said count $c_{n2}$ is equal to or greater than said number $C_N$, ending the search, else, if the total number of phases q in said PN space has not been reached, updating the phase i of said local PN code signal to i+1, and then repeating said (a,b,c) combining, integrating, and comparing steps with updated values;

if said total number q is reached, ending the search;

(2) if said first result $Z_1$ is equal to or greater than said first signal classification threshold value $T_{SC1}$, then, setting said count $c_n$ of said PN phases to zero and, if said total number of phases q in said PN space has not been reached, updating the phase i of said local PN code signal to i+1, and then repeating said (a,b,c) combining, integrating, and comparing steps with updated values;

if said total number q is reached, ending the search;

(ii) if said first result $Z_1$ is equal to or greater than said first signal detection threshold value $T_{SD1}$ times (1−y), comparing the value of said first result $Z_1$ to the value of said first signal detection threshold value $T_{SD1}$, and, if said first result $Z_1$ is greater than said first signal detection threshold value $T_{SD1}$, changing said first signal detection threshold value $T_{SD1}$ to said first result $Z_1$, and updating said first signal classification threshold value $T_{SC1}$ to a value equal to the average of the value of said first result $Z_1$ and said first noise estimate value $E_{N1}$, else, retaining said first threshold values $T_{SD1}$ and $T_{SC1}$; and (d) integrating the signal energy of said input signal over a second predetermined time period to obtain a second result $Z_2$;

(e) comparing said second result $Z_2$ to a second signal detection threshold value $T_{SD2}$, and, (i) if said second result $Z_2$ is less than said second signal detection threshold value $T_{SD2}$, comparing said second result $Z_2$ to a second signal classification threshold value $T_{SC2}$, and if said second result $Z_2$ is less than said second signal classification threshold value $T_{SC2}$, then, updating said first noise estimate $E_{N1}$ to $E_{N2}$ and said first phase count $c_{n1}$ to $c_{n2}$, and comparing said updated phase count $c_{n2}$ with said first number of phases $C_N$ to be searched, and if said updated phase count $c_{n2}$ is equal to or greater than said number $C_N$, ending the search, else, if the total number of phases q in said PN space has not been reached, updating the phase i of said local PN code signal to i+1, and then repeating said (a,b,c,d,e) combining, integrating, and comparing steps with updated values;

when said total number q or said number $C_N$ is reached, ending the search;

(ii) if said second result $Z_2$ is equal to or greater than said second signal detection threshold value $T_{SD2}$, changing said second signal detection threshold value $T_{SD2}$ to the value of said second result $Z_2$, and updating said second signal classification threshold value $T_{SC2}$ to a value equal to the average of said second result $Z_1$ and said first noise estimate value $E_{N1}$, and updating said number of phases $C_N$ to be searched, and then, setting said count $c_n$ of said PN phases to zero and, if said total number of phases q in said PN space has not been reached, updating the phase i of said local PN code signal to i+1, and then repeating said (a,b,c,d,e) combining, integrating, and comparing steps with updated values;

when said total number q or said number $C_N$ is reached, ending the search.

* * * * *

UNITED STATES PATENT AND TRADEMARK OFFICE
CERTIFICATE OF CORRECTION

PATENT NO. : 5,642,377
DATED : June 24, 1997
INVENTOR(S) : Chung et al.

It is certified that error appears in the above-indentified patent and that said Letters Patent is hereby corrected as shown below:

Claim 2, col. 15, line 42, should read --exceeds a second signal detection threshold value $T_{SD2}$--; and Claim 3, col. 16, line 4, "$(-T_{SC}/EN)$" should read --$(-T_{SC}/E_N)$--.

Signed and Sealed this

Second Day of September, 1997

BRUCE LEHMAN

Attest:

Attesting Officer

Commissioner of Patents and Trademarks